US010016056B2

(12) United States Patent
Sklansky (10) Patent No.: US 10,016,056 B2
(45) Date of Patent: Jul. 10, 2018

(54) MODULAR ORGANIZATION SYSTEM AND MEANS OF INTERCONNECTION AND SUPPORT

(71) Applicant: Jordan Michael Sklansky, Buffalo Grove, IL (US)

(72) Inventor: Jordan Michael Sklansky, Buffalo Grove, IL (US)

( * ) Notice: Subject to any disclaimer, the term of this patent is extended or adjusted under 35 U.S.C. 154(b) by 0 days.

(21) Appl. No.: 15/247,741

(22) Filed: Aug. 25, 2016

(65) Prior Publication Data

US 2017/0055702 A1 Mar. 2, 2017

Related U.S. Application Data

(60) Provisional application No. 62/209,965, filed on Aug. 26, 2015.

(51) Int. Cl.
*A47B 47/00* (2006.01)
*A47B 47/04* (2006.01)
(Continued)

(52) U.S. Cl.
CPC ........ *A47B 47/042* (2013.01); *A47B 47/0008* (2013.01); *A47B 47/047* (2013.01);
(Continued)

(58) Field of Classification Search
CPC ..... A47B 87/00; A47B 87/007; A47B 87/008; A47B 87/02; A47B 87/0276;
(Continued)

(56) References Cited

U.S. PATENT DOCUMENTS

| 846,881 A | * | 3/1907 | Walton | A47B 87/02 312/107 |
| 894,638 A | * | 7/1908 | Heim | B65D 11/10 119/472 |

(Continued)

FOREIGN PATENT DOCUMENTS

| DE | 19758058 | * | 7/1999 |
| DE | 102013100352 | * | 7/2014 |

(Continued)

*Primary Examiner* — Janet M Wilkens
(74) *Attorney, Agent, or Firm* — IP Patent Clinic, The John Marshall Law School (57) ABSTRACT

A customizable organizational and internal communications system comprises several interconnected modules, wherein the modules therein can be firmly interlocked and easily interchanged. The organizational system comprises multiple rectangular modules having longitudinal channels at all corners, each module being formed by four rectangular panels having alternating rectangular crenellations and rectangular recesses which are inversely configured on two opposite edges; multiple interlocking pins having a shape which is fitted into hollow space defined by the corner channels of adjacent modules so as to keep them from moving apart; and an optional rectangular box frame surrounding the assembly of multiple rectangular modules. Accessory panels having various functions, such as calendar, key holder, can be inserted in each module to provide for desired functionality customized by the end user.

19 Claims, 12 Drawing Sheets

(51) Int. Cl.
*A47B 97/00* (2006.01)
*F16B 12/24* (2006.01)
*A47B 95/00* (2006.01)

(52) U.S. Cl.
CPC .............. *A47B 97/00* (2013.01); *F16B 12/24* (2013.01); *A47B 95/008* (2013.01); *A47B 2220/0088* (2013.01); *A47B 2230/0037* (2013.01); *A47B 2230/0096* (2013.01)

(58) Field of Classification Search
CPC ............ A47B 87/0284; A47B 87/0292; A47B 47/0091; A47B 47/0075; A47B 47/042; A47B 47/00; A47B 95/008; A47B 96/201; A47B 2097/003; A47B 2220/0088; A47B 2230/0037; A47B 2230/02; Y10T 403/341; Y10T 403/342; Y10T 403/347
USPC ............. 312/107, 108, 111, 198, 257.1, 263, 312/265.5, 265.6, 242; 446/487; 220/4.34, 4.31, 4.33
See application file for complete search history.

(56) References Cited

U.S. PATENT DOCUMENTS

| | | | | |
|---|---|---|---|---|
| 2,644,553 A | * | 7/1953 | Cushman .............. | E04B 1/6179 114/201 R |
| 3,191,726 A | * | 6/1965 | Pavlecka ................ | B62D 33/04 52/275 |
| 3,751,127 A | * | 8/1973 | Black, Jr. ........... | A47B 47/0041 312/111 |
| 3,836,217 A | * | 9/1974 | Shiina ................ | A47B 47/0041 312/107 |
| 4,125,338 A | * | 11/1978 | Lew .................... | A47B 47/0041 312/263 |
| 4,676,038 A | * | 6/1987 | Doyon ............... | A47B 47/0041 403/231 |
| 4,717,214 A | * | 1/1988 | Moore ..................... | A47D 5/00 220/7 |
| 5,039,177 A | * | 8/1991 | Newell ............. | A47B 47/0033 160/135 |
| 5,357,728 A | * | 10/1994 | Duncanson .......... | A47B 47/042 403/381 |
| 5,466,057 A | * | 11/1995 | Blankenburg ....... | A47B 87/005 312/108 |
| 2004/0140739 A1 | * | 7/2004 | Saravis .............. | A47B 47/0033 312/111 |
| 2006/0237455 A1 | * | 10/2006 | Vargas ..................... | B65D 7/24 220/4.34 |
| 2006/0250052 A1 | * | 11/2006 | Davis .................. | A47B 47/042 312/107 |
| 2011/0241505 A1 | | 10/2011 | Tashjian | |
| 2013/0048632 A1 | * | 2/2013 | Chen ....................... | B65D 9/24 220/4.33 |

FOREIGN PATENT DOCUMENTS

| | | | |
|---|---|---|---|
| EP | 2166170 | * | 3/2010 |
| WO | 2009015311 | * | 1/2009 |

* cited by examiner

MODULAR ORGANIZATION SYSTEM AND MEANS OF INTERCONNECTION AND SUPPORT

CROSS-REFERENCE TO RELATED APPLICATION

This is a non-provisional application of U.S. Patent Application Ser. No. 62/209,965, filed on Aug. 25, 2015, the entire specification of which is incorporated by reference as if fully set forth herein.

1. Field of the Invention

The present invention relates generally to a personal, family, or corporate organizational and communications system displayed as a decorative furnishing, and more specifically relates to a flexible modular organizational system capable of being reconfigured easily and quickly without complete disassembly and with greater efficiency.

2. Background Art

An organizer or organizational system is a common furniture for temporary storage in many residential houses, apartments, condominiums or office. One example is shown and described in U.S. Pat. No. 5,466,057A, which provides a type of modular organizer comprising a plurality of planar panel members and a plurality of edge connectors. Edge connectors are capable of interconnecting the side edges of a plurality of adjacent disposed panel members into a peripherally enclosed structure having at least one storage compartment formed between the panel members.

In US Published Patent Application No. 20110241505 A1, another type of modular organizer is shown and illustrated. It comprises pre-made modules and cruciform interlockers which attach completed adjacent modules into a whole. However, while actual demand for such organizers varies, the prior-art designs fail to provide for easy reassembling with convenient interchangeability and solid interlocking of modules into a rigid structure.

SUMMARY OF THE INVENTION

The present invention provides a customizable organizational system comprising modules having predetermined dimensions, wherein the modules therein can be firmly interlocked and easily interchanged. More specifically, the organizational system according to the present invention comprises multiple rectangular modules having longitudinal channels at all corners, wherein the cross-section of each channel is substantially circle-shaped and has an outwardly facing opening providing access to the channel. The outwardly facing opening comprises an angular dimension that is less than one-third circular arc of a completed circle. Each module is assembled by using four rectangular panels having alternating rectangular crenellations and rectangular recesses which are inversely configured on two opposite edges, each crenellation having a width essentially identical with the recess of the corresponding location on the opposite edge, the height of the crenellations, that is, the distance from the trough portion to the peak portion being equal to thickness of the panels. Thus, when two panels are vertically assembled by engaging crenellations of one panel into recesses of the adjoining panel they coordinate to form the module corner, and channel segments on all crenellations constitute the longitudinal channel of the module. Multiple interlocking pins having a shape which is fitted into hollow space defined by the corner channels of four adjacent modules so as to keep them from moving apart, wherein the interlocking pin is longitudinal and has a cross-section with four round-shaped corner beads; and a rectangular box frame surrounding the assembly of multiple rectangular modules, wherein the box frame has multiple longitudinal channels on its inner surface, so as to form, with the corner channels of adjacent modules, multiple hollow spaces having the same shape as the interlocking pins for receiving the interlocking pins.

BRIEF DESCRIPTION OF THE DRAWINGS

The present invention will now be discussed in further detail below with reference to the accompanying figures in which.

DETAILED DESCRIPTION OF THE PREFERRED EMBODIMENTS

Figure 1:
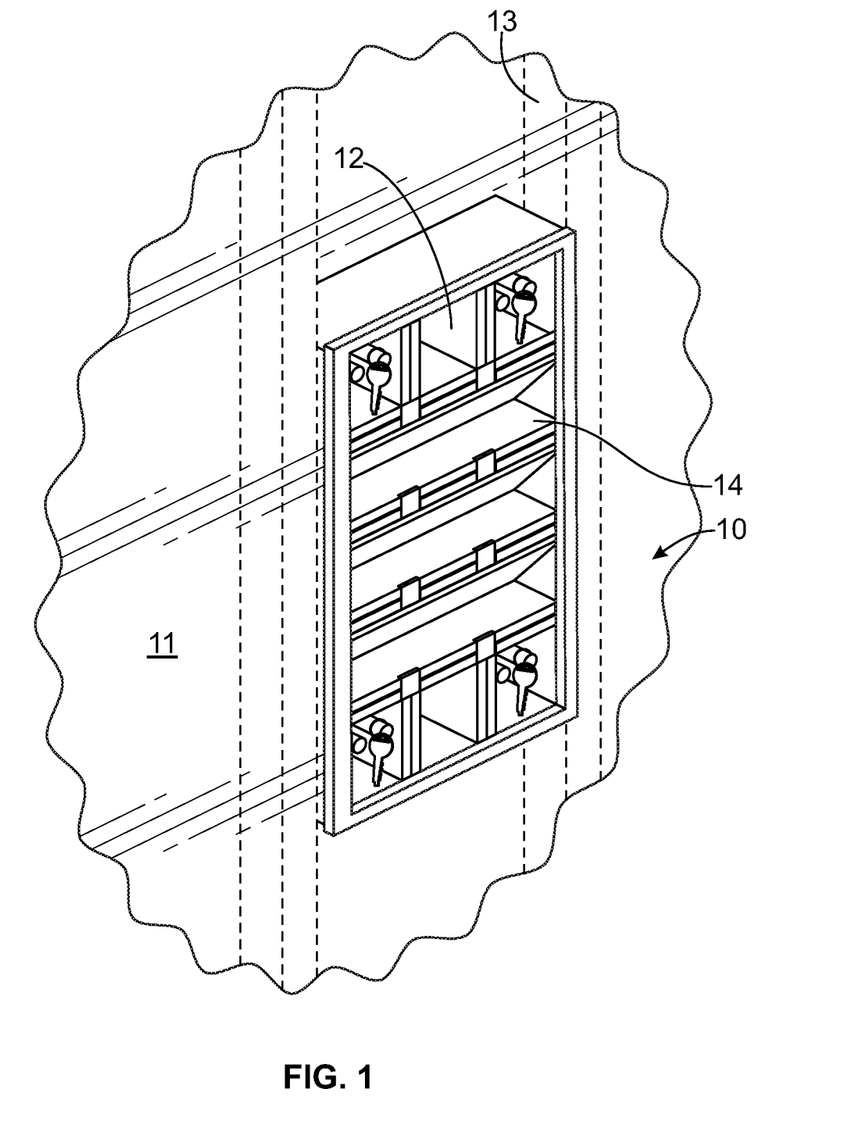
FIG. 1 is a perspective view of the organizational system according to the present invention, which is mounted within a wall surface between adjoining studs.
Figure 2:
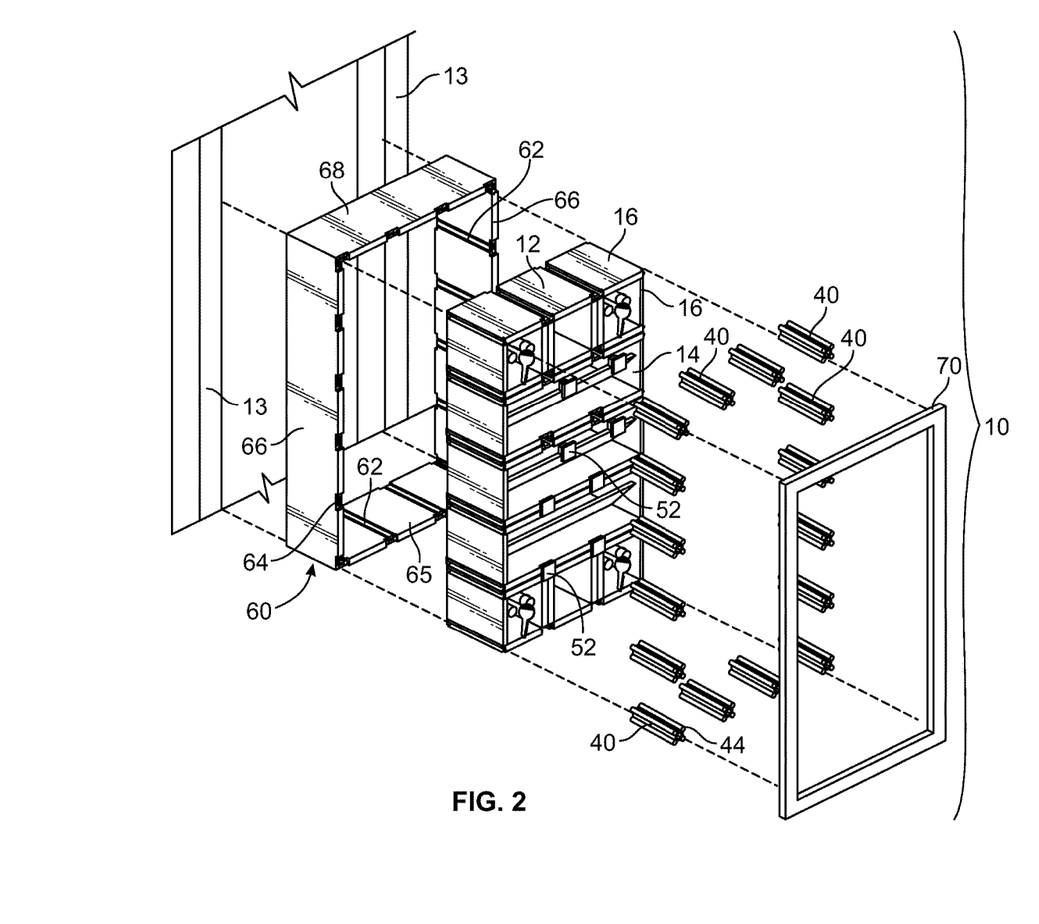
FIG. 2 is an exploded perspective view of an organizational system as shown in FIG. 1 according to the present invention.
Figure 4:
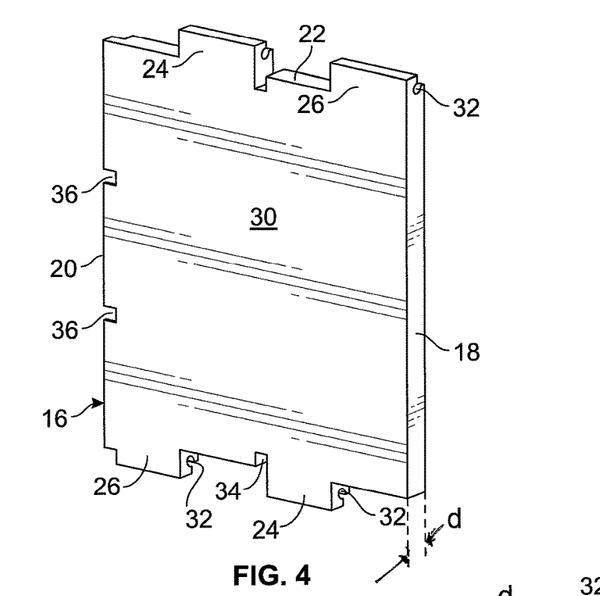
FIGS. 4 and 5A are perspective views illustrating rectangular panels for forming modules of the present invention.
Figure 5A:
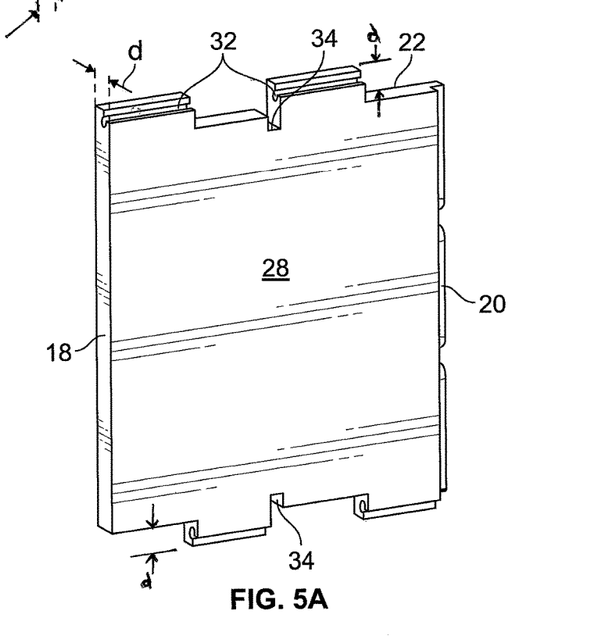
Figure 9:
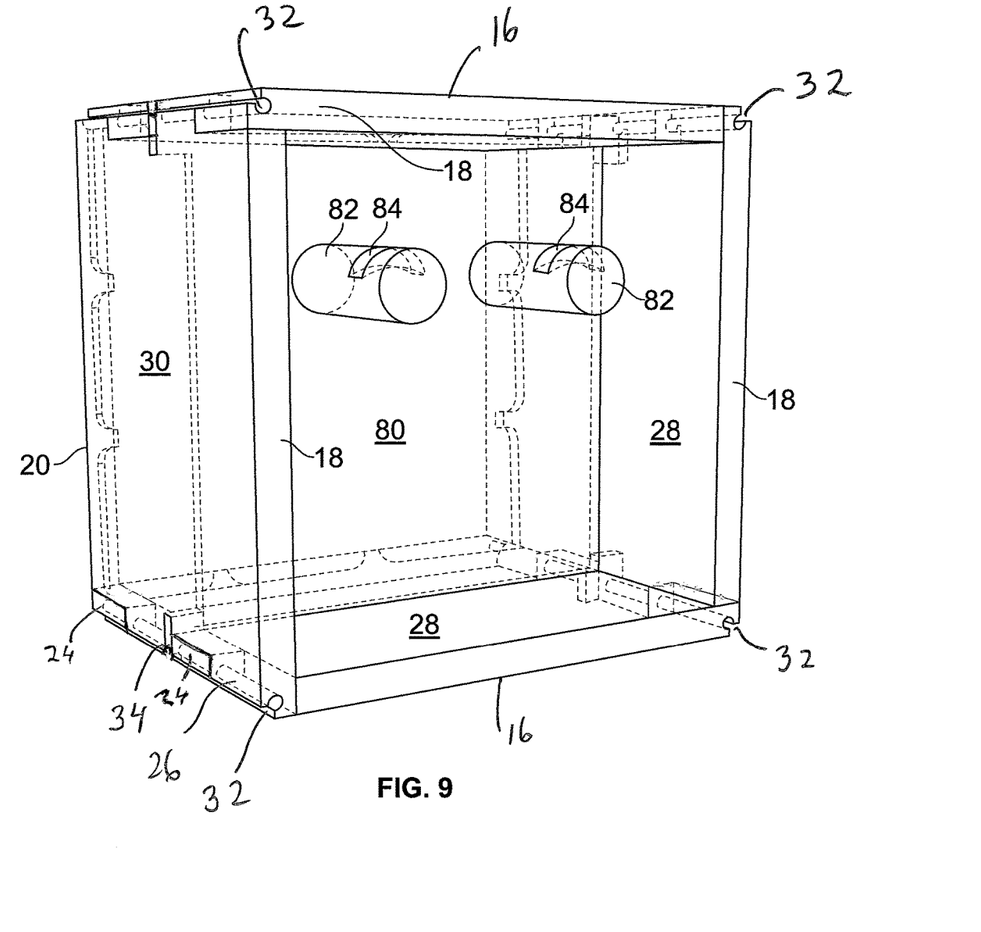
FIG. 9 is a perspective view using broken lines illustrating how four rectangular panels and one accessory (key holder) are assembled to form a functional module.
Figure 10:
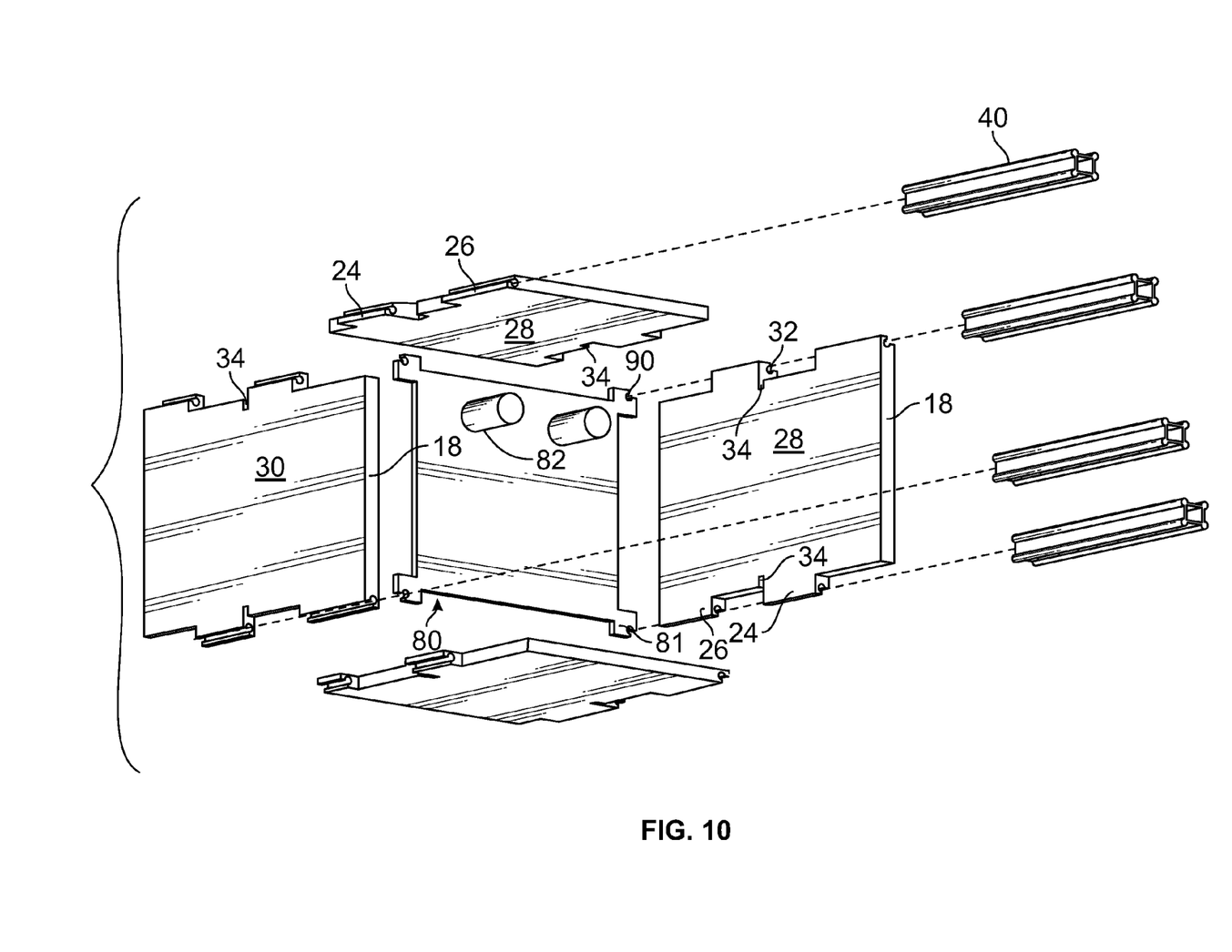
FIG. 10 is an exploded view of FIG. 9 showing how interlocking pins are fitted into the channels at the module corners.

Referring now to FIGS. 1 and 2, the key inventive concept of the present inventive system 10 lies in rectangular modules 12 formed by four identical rectangular panels 16 having alternating rectangular crenellations, 24 and rectangular recesses which are inversely configured on two opposite edges 22, height of the crenellations being essentially equal to thickness of the panels. In an exemplary embodiment, FIGS. 4 and 5A shows inner and outer surfaces 28, 30 respectively of the panel 16. The term "alternating" here means that on each of the two opposite edges, the crenellations 24, 26 and recesses 22 appear alternately, i.e., each crenellation is next to a recess and each recess is next to a crenellation. The term "inversely configured" here means, as compared to the configuration on the first edge (bottom edge), crenellations 24, 26 and recesses 22 on a second edge (top edge), which is opposite to the first edge, appear in a totally inverse manner. Namely, if one first crenellation 24 appears on the first edge, its corresponding location on the second edge will be one second recess 22 having the same width as the first crenellation 24; while if one first recess appears on the first edge, its corresponding location on the second edge will be one second crenellation having the same width as the first recess. The fold symmetry is such that rotation by 180.degree. provides the identical shape. With these features, two adjacent panels 16 can be well assembled vertically by engaging first crenellations 24, 26 of one panel into second recesses 22 of the adjoining panel to form the module corner. FIGS. 9 and 10 show how crenellations 24, 26 and recesses of four panels are assembled in an end-to-end way, so as to form a module.

FIGS. 4 and 5A show one preferred embodiment wherein the panel 16 has two crenellations 24, 26 and two recesses 22 alternating on each edge. The present invention can further encompass other embodiments with panels having various numbers of crenellations and recesses. For example, in another embodiment (not shown), the panel may have only one crenellation and one recess on each of the opposite edges, which are inversely configured. In another embodiment (not shown), the panel may have three crenellations and three recesses alternating on each of the opposite edges, which are inversely configured. In another embodiment (not shown), the panel may have four crenellations and four recesses alternating on each of the opposite edges, which are inversely configured, and so on. More crenellations and recesses may provide better engagement, but at the sacrifice of structural strength.

Alternatively, the present invention can further encompass other embodiments with panels having different numbers of crenellations and recesses on each edge. For example, in another embodiment (not shown), the panel may have two first crenellations and one first recess alternating on the first edge, as well as one second crenellation and two second recesses alternating on the second edge opposite to the first edge, which are inversely configured. In this case, there is not the same symmetry and will require different panels 16. In another embodiment (not shown), the panel may have three first crenellations and two first recesses alternating on the first edge, as well as two second crenellations and three second recesses alternating on the second edge opposite to the first edge, which are inversely configured. In another embodiment (not shown), the panel may have four first crenellations and three first recesses alternating on the first edge, as well as three second crenellations and four second recesses alternating on the second edge opposite to the first edge, which are inversely configured, and so on.

In the preferred embodiment as shown in FIGS. 4 and 5A, all the crenellations 24, 26 and recesses 22 possess the same width. However, a skilled person in the art will readily understand that the crenellations and recesses on one edge do not necessarily possess the same width. As long as each crenellation has a width essentially identical with the recess at the corresponding location on the opposite edge, they can be perfectly engaged (since height of the crenellations is equal to thickness of the panels) when four panels are vertically assembled in an end-to-end way to form a module. In a detailed embodiment (not shown), a crenellation may have a width greater than the recess next thereto; while on its opposite edge, a crenellation may have a width shorter than the recess next thereto.

Figure 8:
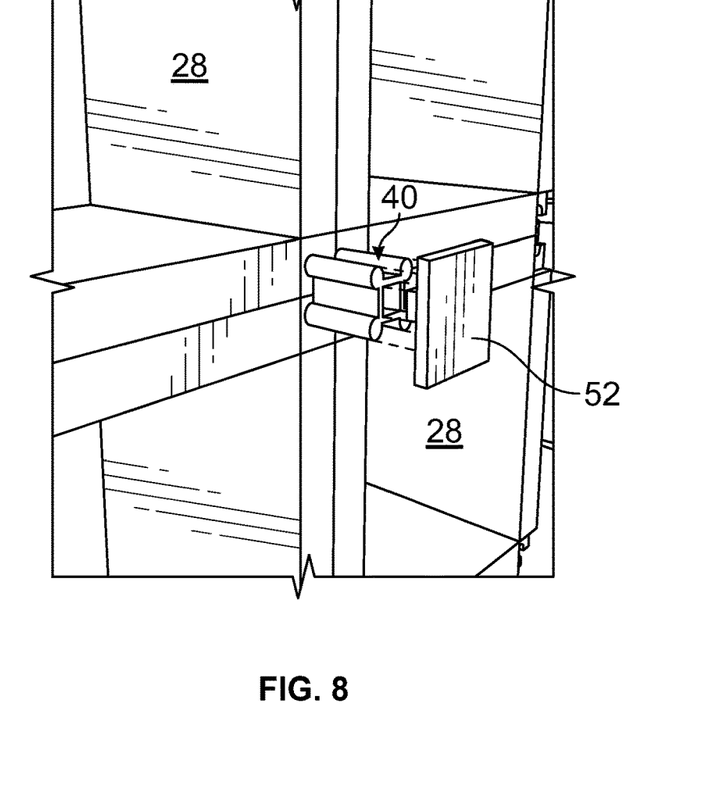
FIG. 8 is a partial enlarged view showing one embodiment of the present invention having an interlocking pin cap.

The interlocking pin according to the present invention has four round-shaped corner beads for holding the modules by being slid into the circle-shaped corner channels, so its cross-section has four symmetric axes and one symmetric center. When four modules are arranged in a 2×2 grid as shown in FIG. 8, the shape of the interlocking pin 40 is always identical to the hollow space defined by the four adjacent corner channels. Depending on the position/size of module corner channels and its outwardly facing opening, the above-mentioned hollow space and corresponding interlocking pin can be variously shaped.

Figure 3A:
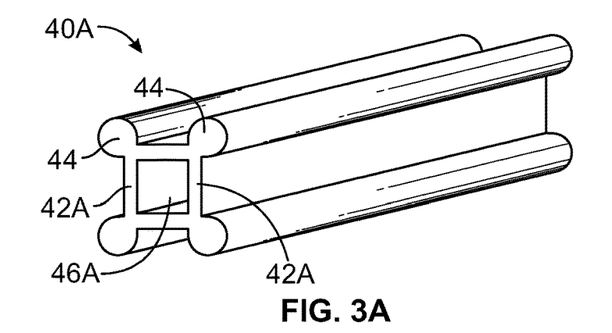
FIGS. 3A to 3D are perspective views showing several embodiments of the interlocking pins used in the present invention.
Figure 3B:
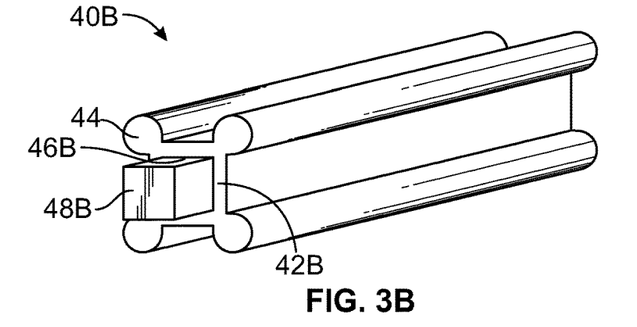
Figure 3C:
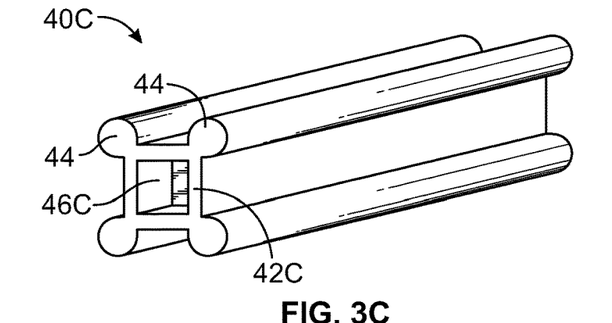
Figure 3D:
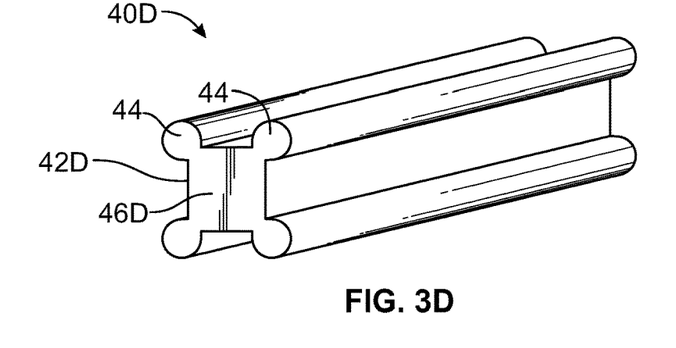

FIGS. 3A to 3D show several embodiments of interlocking pins 40 which can match the embodiment as described in FIGS. 9 and 10 (wherein FIG. 10 clearly shows how interlocking pins 40 are fitted into the corner channels of an assembled module). The interlocking pins 40 in these figures have four round-shaped corner beads 44 and one central spine 46. The central spine 46A in FIG. 3A is hollow, for the purpose of such as weight reduction and wire routing. At the front surface (facing the user) of the central spine 46B, cuboid projection 48B in FIG. 3B and cuboid hole 42C in FIG. 3C are for the purpose of securing an interlocking pin cap or a box frame front cover (which will be discussed below). The central spine 46D in FIG. 3D is solid, providing greater strength.

The following description of the assembly of panels into a module where the corner channels for the module provide for receiving the interlocking pin bead 44 that connects that module corners of adjacent panels so that the modules retain their rigid configuration when assembled.

FIG. 9 clearly shows four longitudinal channels 32 at all corners of the module. The cross-section of each channel 32 is substantially circle-shaped and has an outwardly facing opening. It is important that the outwardly facing opening is no more than one-third circle, so that the module can be firmly held by sliding the corner bead 44 of the interlocking pin 40 into the channel 32. If the opening occupied more than one-third of the whole circle, it can be imagined that the corner bead 44 will easily fall out of the channel 32.

FIG. 9 also clearly shows that each corner channel 32 is formed by several channel segments on the first crenellations 24, 26 of one panel 16 and the second crenellations 24, 26 of its adjacent panel 16, as they are perfectly engaged. As stated above, no matter which kind of configuration of crenellations and recesses is applied (such as the configuration in the preferred embodiment as shown in FIG. 4, the configuration with different numbers of crenellations and recesses, or the configuration with different widths of crenellations and recesses) to achieve a perfect engagement at a corner, all the channel segments on the involved crenellations should be completely aligned to form a longitudinal channel 32 with an outwardly facing opening, and the opening having a center that projects at a 45° angle from the surface 30.

Figure 7:
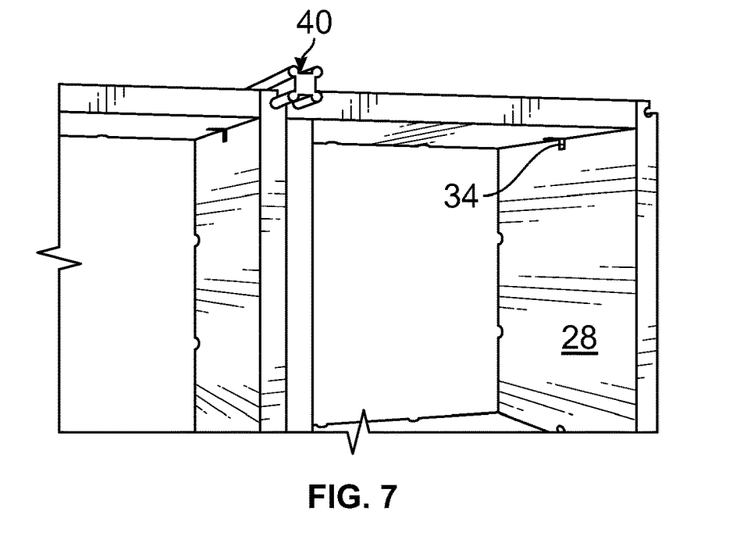
FIG. 7 is a partial enlarged view showing how adjacent modules are secured to each other by interlocking pins.

Optionally, a box frame is provided to surround the assembly of multiple rectangular modules 12 with interlocking pins 40, wherein the box frame 60 has multiple longitudinal channels 62 on its inner surface 65, so as to form, with the corner channels 32 of adjacent modules, multiple hollow spaces having the same shape as the interlocking pins 30 and fitting them in. FIG. 2 shows one embodiment with a box frame 60, wherein two adjacent module corner channels in the top row form an ω-shaped space to fit in the bottom half (i.e., two beads 44) of the interlocking pin 40 (which is enlarged in FIG. 7). Correspondingly, the box frame 60 as shown in FIG. 2 also has an inverted ω-shaped channel 64 to fit in the top half of the interlocking pin 40, i.e., the hollow space here, having the shape identical to the interlocking pin 40, is formed by two adjacent module corner channels 32 in the top row as well as the ω-shaped channel 64 on the inner surface of the box frame 60. Similar situations occur at the bottom row and two side columns. At each corner of the box frame, because only one corner channel 32 is provided by the module to contain one bead 44 of the interlocking pin 40, the inner surface of the box frame corner will have to provide cover channels 62 to contain the remaining three beads 44 of the interlocking pin 40. That is to say, the hollow space here, having the shape identical to the interlocking pin 40, is formed by one module corner channel 32 as well as the club-shaped space on the inner surface of the box frame corner.

Figure 6:
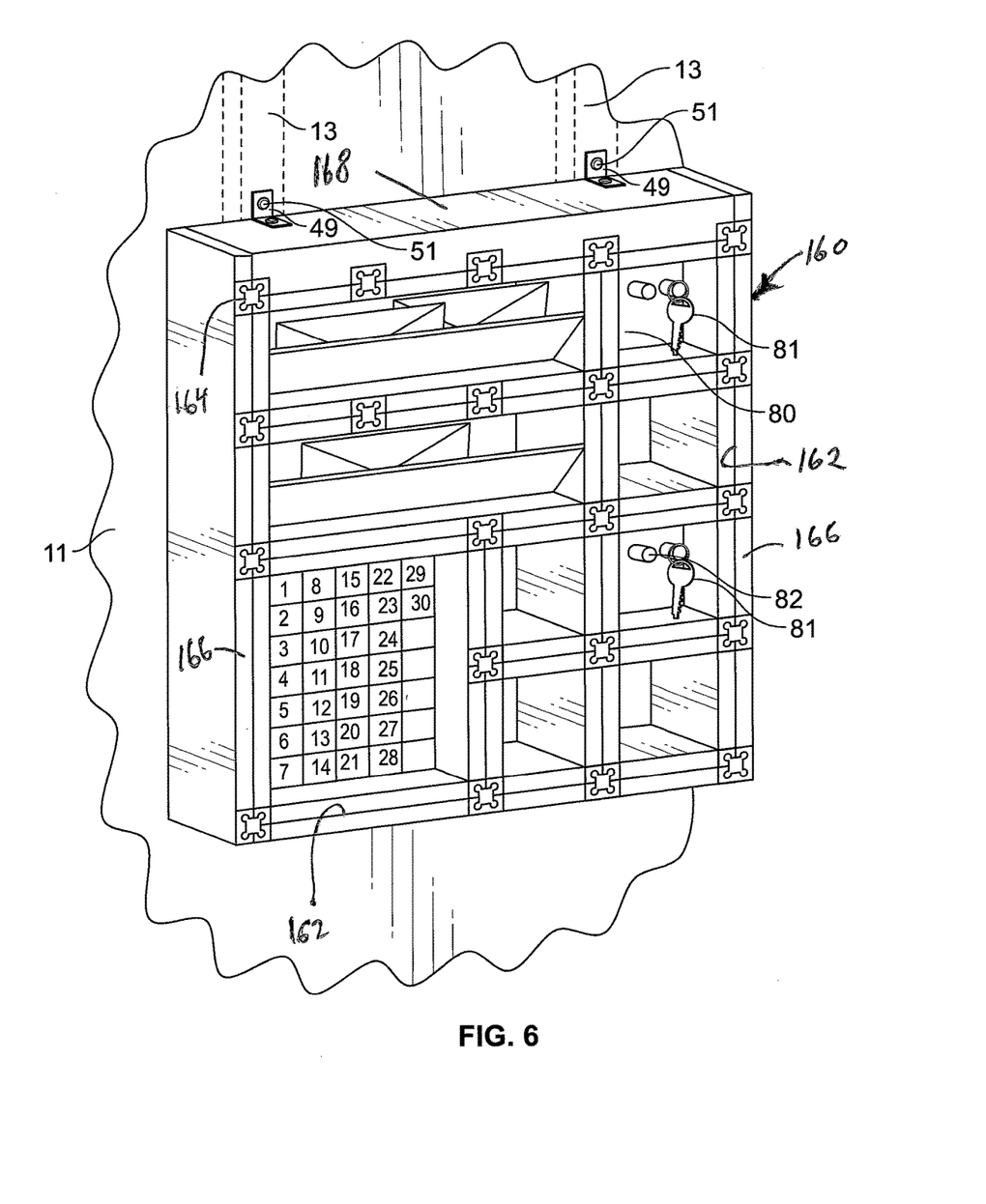
FIG. 6 is a perspective view showing a second embodiment of the present invention in which the organizational system is mounted on a support and external of the wall surface.

The box frame 60 according to the present invention does not necessarily consist of one piece. FIG. 6 shows another embodiment, wherein the box frame 160 comprises four separate walls 162, 164, 166, 168. The interlocking pins 40 at four corners of the box frame 160 in this embodiment also serve to hold two adjacent pieces of walls, e.g., walls 166, 168, together, in addition to securing the corner module 12 to the box frame 60. The securing manner at top and bottom rows as well as two side columns is identical to the previous paragraph.

Furthermore, the box frame serves to mount the whole assembly of organizational system into or onto the standing wall 11. FIG. 1 shows an in-wall mounting manner with two wall studs 13 (dotted lines) for mounting the organizational system. FIG. 6 shows an on-wall mounting configuration. The mounting may be effected by means of corner brackets 49 attached to the studs 13, within the wall surface 11, by an appropriate means such as wood screws 51, as shown in FIG. 6. A skilled person in the art can readily understand that the mounting manner depends on actual demand, regardless of whether the box frame consists of one piece or multiple pieces.

Figure 5B:
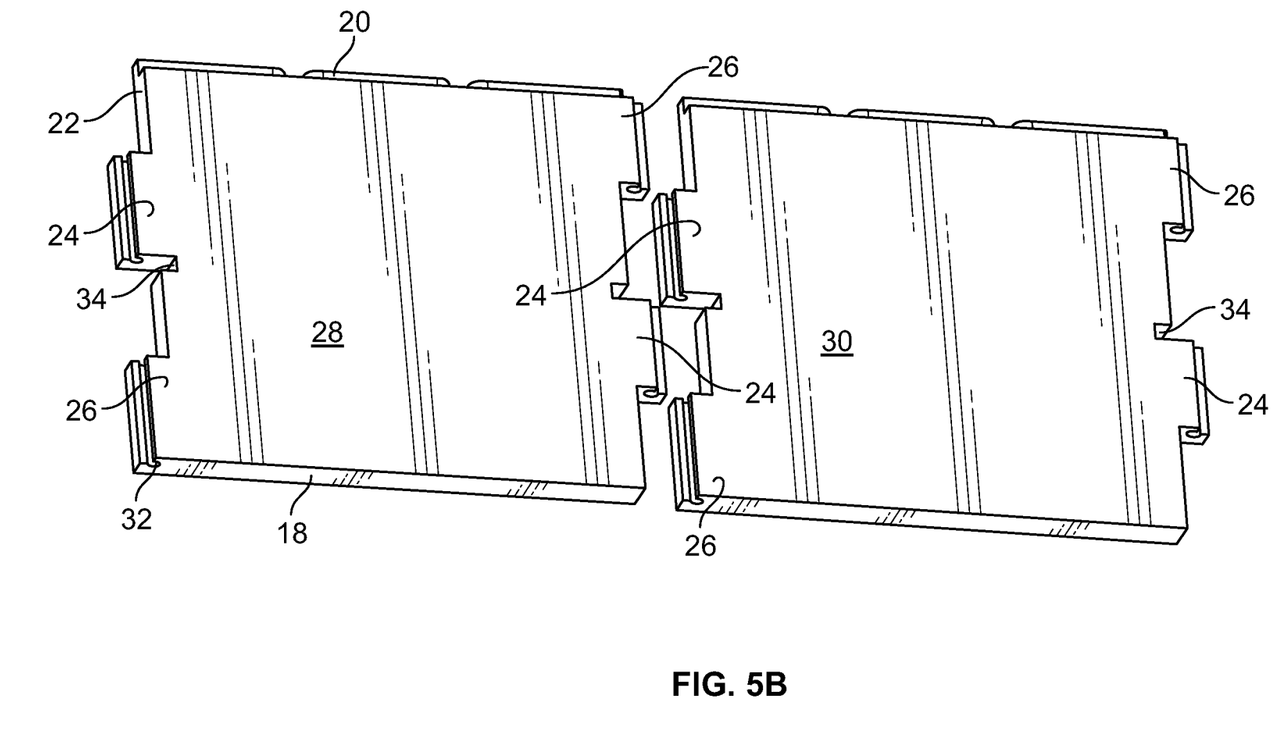
FIG. 5B is a perspective view of the orientation of two adjoining panels as shown in FIGS. 4 and 5A being connected to each other.
Figure 6A:
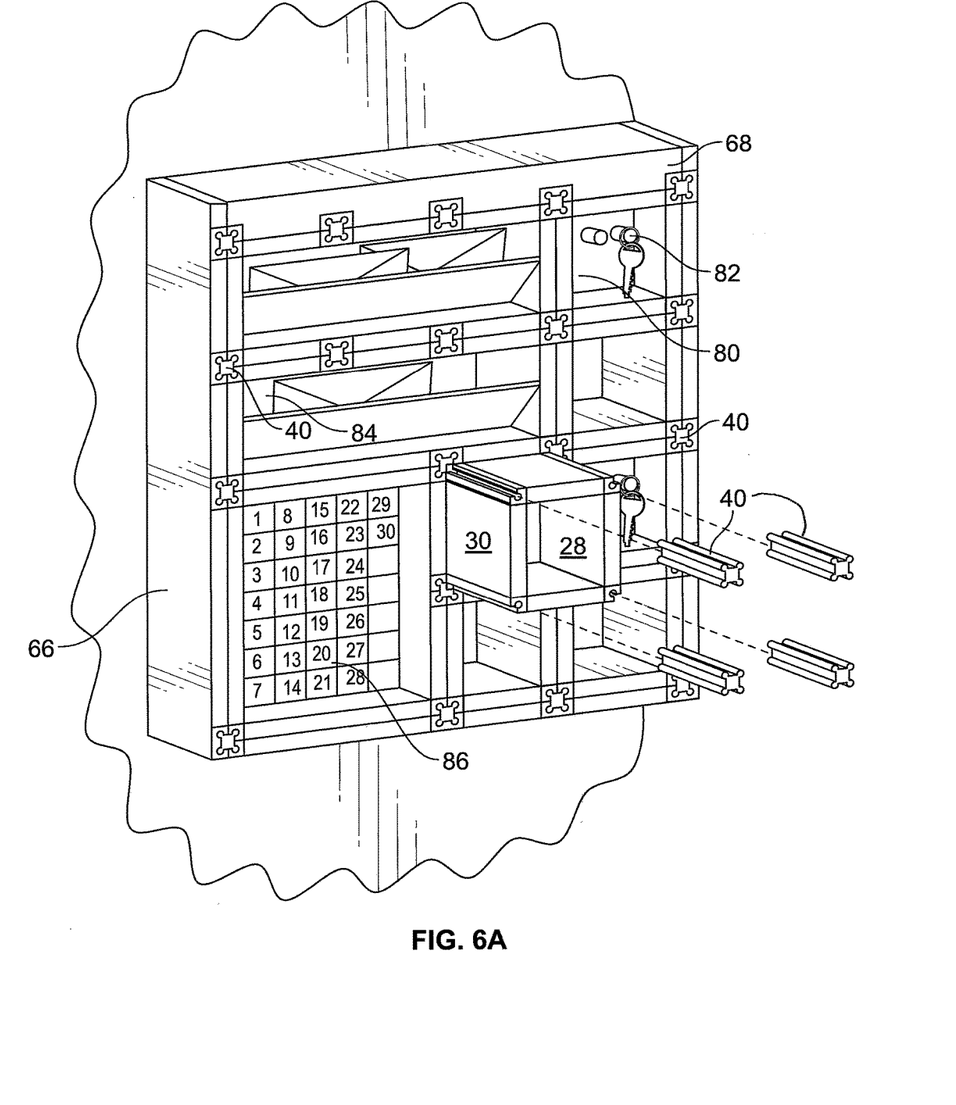
FIG. 6A is a perspective view showing how a single module is removed for reconfiguration.
Figure 13:
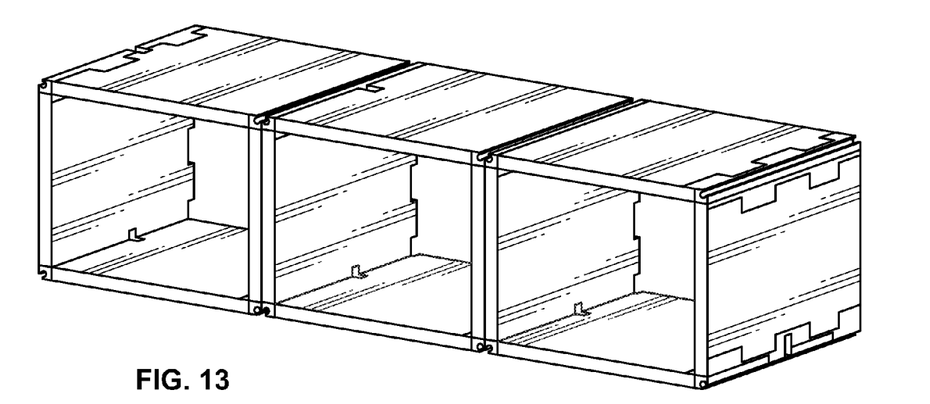

In addition to the embodiment where a single square module is formed by four regular panels (i.e., one square long) as shown in FIGS. 9 and 10, the organizational system according to the present invention can also comprise a multiple-square module comprising end-to-end or vertically connected module sections to form a unitary storage space, as shown in FIGS. 6A and 13. For instance, FIG. 6A shows three-square modules 84 for use as mailbox and a two-square-width two-square-high module 86 for use as calendar. Such multiple-square module, which is as at least two times long (such as two times, three times, four times, or other integer times) in width and/or height as the single square module as shown in FIG. 9, can be formed with longer panels. Alternatively, the panels may be joined end to end to provide a 2× or 3× length of panel as shown in FIG. 5B, described below. In an exemplary embodiment of mailbox module as shown in FIG. 6, the top and bottom panels are both three-square-long, whereas the two side panels are regular ones (i.e., one square long). Here, an important thing lies in that these three-square-long panels have ω-shaped channels on the outer surface at their points of trisection, so as to form hollow space with above-defined shape for receiving interlocking pins. In another exemplary embodiment of calendar module as shown in FIG. 6, the two-square-long panels also have ω-shaped channels at their outer surface at their midpoints, so as to form hollow space with above-defined shape for receiving interlocking pins. Similarly, it is not difficult to imagine that if a four-square module is formed by two four-square-long panels and two regular panels, these four-square-long panels will have ω-shaped channels on the outer surface at their points of quadrisection, so as to form hollow space with above-defined shape for receiving interlocking pins.

Figure 14:
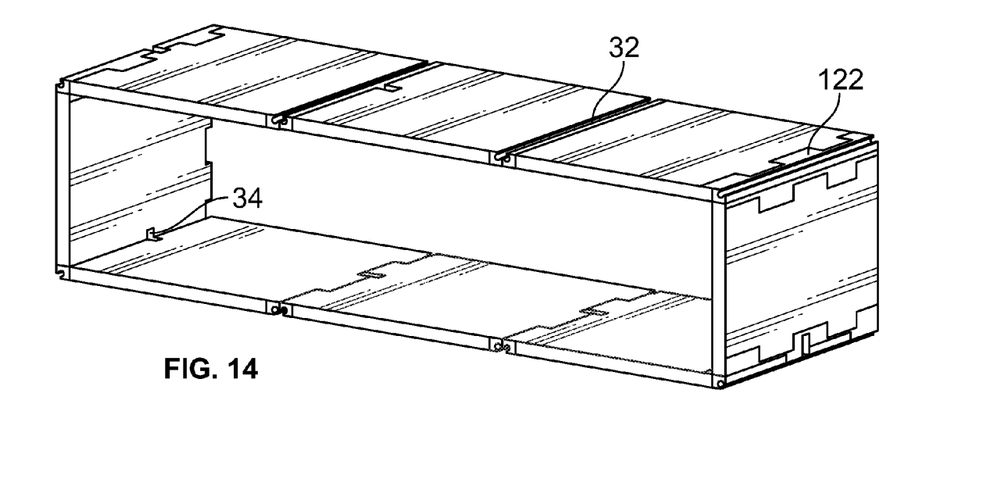
FIG. 14 is a perspective view showing another embodiment of a three-panel-long module.

Another way to form a multiple-square module is shown in FIG. 14. In this embodiment, three panels 16 are disposed lengthwise horizontally end to end to form a top surface and three more panels 16 are disposed to provide for a bottom surface of a three-unit module. Of course, the ends of this module are defined by two vertical panels 20, all the panels cooperatively interfitting at their crenelated edges as in the other embodiments described above. Certain manipulations or alterations to the interconnecting pin (not shown) may be required to accommodate the dimensions of a specific three-unit module when it takes up the space of three separate one unit modules, but that can be done by judicious use of the interconnecting pin structure.

In the preferred embodiment, as shown, each assembled module could contain one or more functional accessories which may be mounted on rectangular inserts 80 (FIG. 9). These inserts 80 may include any desirable functional elements, such as an envelope holder, key holder, cell phone or other electronic device charger, writing/display board, calendar, and mirror. However, the discerning user could conceivably provide for additional functional inserts (not shown) and this invention is not to be considered as being limited by the enumerated functional inserts.

One common element in all of the insert 80 embodiments having functional accessories is the accessory tab slots 34, preferably being centrally disposed on the crenellated edge 22 of each panel 16, so as to firmly hold the functional accessories by fitting the accessory tabs into the accessory tab slots. FIG. 10 shows one exemplary design of such combination of accessory tabs 81 and accessory tab slots 34, wherein the accessory tab slots 34 are located among the crenellations and recesses at two opposite edges of the panel, while the accessory tabs 81 are located at each corner of the key holder accessory 80. Accessory tab channels 90 having an outwardly facing opening are present on each accessory tab 81, so that when the accessory tab 81 is fitted into accessory tab slots 34 during module assembly, these accessory tab channels 90 will be perfectly aligned to other channel segments forming the channel 32 on the adjacent crenellations to form a complete channel 32 for fitting in a corner bead of interlocking pins 40. This structurally is a more robust configuration in that both the tab slots 34 and the interlocking pins 40 retain the accessory 80.

There are other designs to locate the accessory tab slots in different manners. In one embodiment where the accessory tab slots are in the middle of each panel, the accessory tabs are correspondingly located at the middle of each edge of the accessory, so that the machining process can be simplified. In another embodiment where the number of the accessory tab slots is not intendedly limited, each panel can have more than one (such as two, three, four, etc.) slots in the middle; correspondingly, the same number of accessory tabs are located at the middle of each edge of the accessory, so that the strength can be improved. It is not difficult to imagine that, in another embodiment, the accessory tab slots can be located both at two opposite edges and in the middle of the panel, while the accessory tabs are correspondingly located both at each corner (with accessory tab channels as above stated) and at the middle of each edge of the accessory.

FIGS. 1 and 2 show that a box frame front cover 70, as an optional element of the organizational system 10, is in front of the other parts for structural and aesthetical purpose. It can be seen from the exploded view in FIG. 2 that if the interlocking pins 40A, 40C of FIGS. 3A and 3C are applied, the back side of the box frame front cover 70 can have cuboid projections at corresponding locations to be inserted into the hollow central spines 46A or into the cuboid holes 46C of the central spines 42C; while if the interlocking pins 40B of FIG. 3B are applied, the back side of the box frame front cover 70 can have cuboid holes to fit in the cuboid projections 48B of the central spines 42B. In addition, if the interlocking pins 40D of FIG. 3D are applied, the back side of the box frame front cover may be flat and glued onto the front surface of the central spines 46D.

Different from the box frame front cover 70 which is secured to the outermost interlocking pins, FIG. 8 shows an interlocking pin cap 52 which is secured to a middle interlocking pin 40 among modules. Here, although an interlocking pin 40A, 40C of FIG. 3A or 3C is shown, a skilled in the art can readily understand that this cap 52 can be secured in similar manners as set forth for box frame front cover 70 if another type of interlocking pin 40 is applied.

Figure 11:
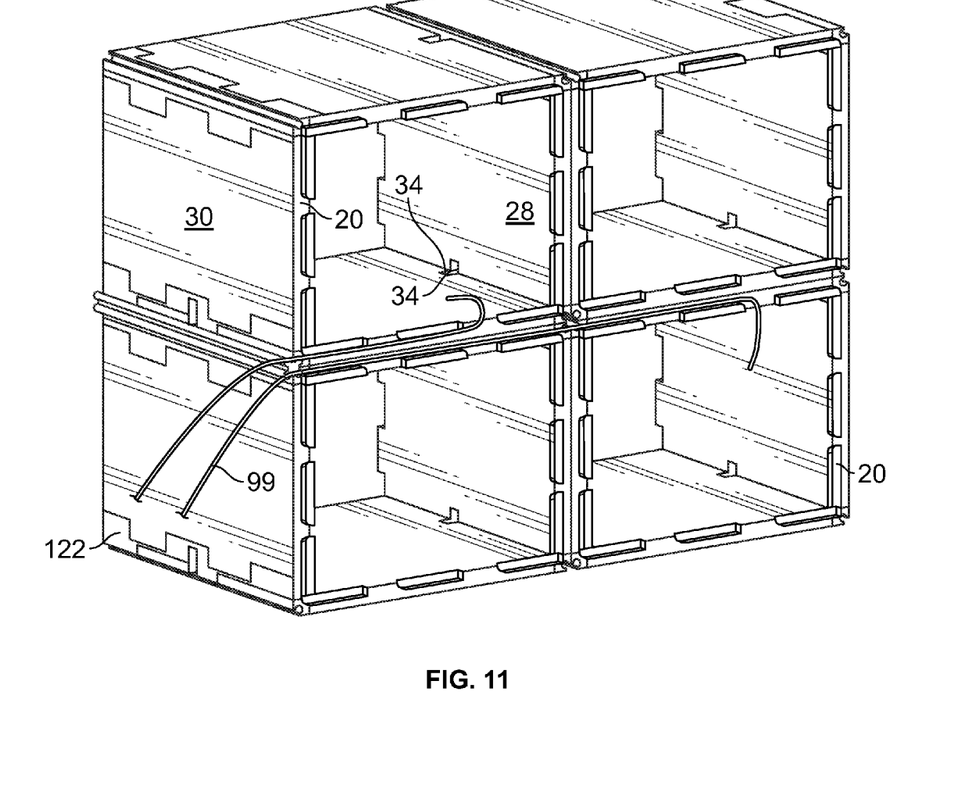
FIG. 11 is a perspective view showing another embodiment of the present invention, wherein the crenellated edges of each rectangular panel are made of metal, and electric wires extend through the space between panel rear edges.
Figure 12:
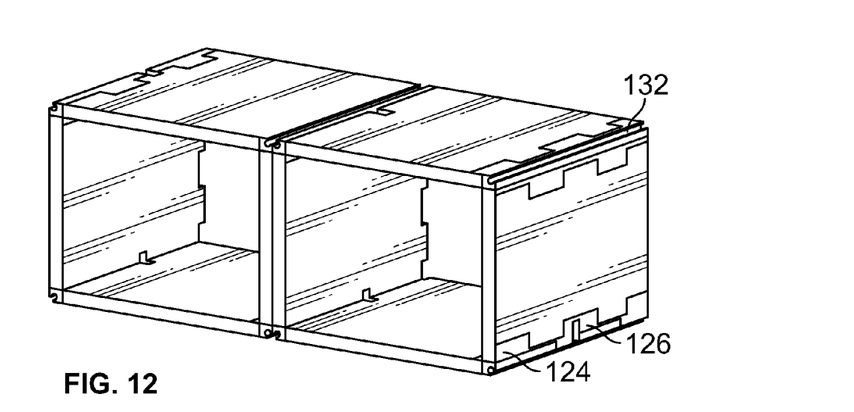
FIGS. 12 and 13 are perspective views showing how multiple modules may be arranged adjacently.

As shown in FIG. 11, the modules may optionally have inconsecutive bars at their rear edge 20 (the surface not facing the user), and the gap between the bars of adjacent modules can allow wire routing, so as to provide power supply to the modules (such as, phone charging). The bars and the space therebetween can be at any length and height according to the actual demand, which can be readily selected by an ordinary person in the art.

The organizational system according to the present invention will have excellent interchangeability and customizability. More specifically, as shown in FIG. 6A, each module can be removed independently by pulling out the involved interlocking pins 40, and then, for example, this removed module can be added or substituted with any needed accessory. Alternatively, two or more consecutive modules can be replaced by a multi-unit or multiple square module according to the user's desire.

Referring to FIG. 6A, for instance, the four single square modules in the right column can be removed and replaced by a four-square module for use as umbrella storage, in case the weather becomes rainy; or, the calendar module 86 and the two single square modules adjacent thereto can be removed and replaced by two extra three-square modules 84 for use as mail holder, in the case that two additional residents desire to receive mail at the house. Due to the above-stated structural features, all the removal and replacement work can be easily done without any tooling and within a few minutes without destroying the integrity of the whole organizational system. The detailed re-assembling steps will be described below.

In order to change the module next to the calendar module as shown in FIG. 6A, for example, as a key holder module (not shown), four interlocking pins 40 are first pulled out, then the whole module is also removed by sliding it out the four panels comprising the module. Then, the removed module is disassembled into the four constituent panels 16, and by plugging accessory tabs 81 into accessory tab slots 34, a key holder accessory 80 is inserted in the middle of and re-assembled with the four panels 16 in the manner as shown in FIG. 10. Next, the assembled key holder module can be pushed back into the vacant position next to the calendar module, as shown, and the four interlocking pins 40 are also pushed back to secure the key holder module to adjacent panel corners of adjoining modules.

For the purpose of weight reduction and cost saving, the panels and interlocking pins in the present invention can be made of wood, bamboo or plastic. For the purpose of providing strength, the panels and interlocking pins in the present invention can be made of metal, such as steel, copper or aluminum. For either purpose, in preferred embodiments as exemplified in FIGS. 11 to 14, the center part of the panel is made of wood, bamboo or plastic, whereas the crenellated edges 122 of the panel are made of metal. An appropriate means is necessary to bind the two together.

The invention herein has been described and illustrated with reference to the specific embodiments, but it should be understood that the features and operation of the invention as described is susceptible to modification or alteration without departing significantly from the spirit of the invention. For example, the dimensions, size and shape of the various elements may be altered to fit specific applications. Accordingly, the specific embodiments illustrated and described herein are for illustrative purposes only and the invention is not limited except by the following claims.

What is claimed is:

1. An organizational and internal communications system, comprising:
    multiple rectangular modules comprising a plurality of rectangular panels defined by four edges;
    wherein each the multiple rectangular modules are formed by four rectangular panels, each of the four rectangular panels including alternating rectangular crenellations and rectangular recesses, inversely configured on opposite edges, wherein each of the rectangular crenellations includes an outwardly facing opening, wherein the opening is no more than one-third arc of a circle;
    wherein each crenellation includes a width essentially identical to a width of the recess at the corresponding location on the opposite edges, wherein each of the crenellation includes a height equal to a thickness of the rectangular panels;
    wherein crenellations of one of the four rectangular panels engage with recesses of two adjoining panels to form the module corners;
    multiple interlocking pins substantially fit into space defined by longitudinal channels of four adjacent modules to keep them from moving apart, wherein each of the longitudinal channels includes a cross-section that is substantially circular;
    wherein each of the multiple interlocking pins is longitudinal and has a central quadrilateral spine whose cross-section is four round-shaped corner beads; and
    wherein the corner beads are integrally connected to corners of the central quadrilateral spine.

2. The organizational and internal communications system according to claim 1, further comprising a rectangular box frame surrounding the multiple rectangular modules, wherein the rectangular box frame and the longitudinal channels of the four adjacent modules receive the interlocking pins.

3. The organizational and internal communications system according to claim 2, wherein the rectangular box frame includes a unitary quadrilateral structure.

4. The organizational and internal communications system according to claim 2, wherein the rectangular box frame comprises four separate boards connected at the ends to each other.

5. The organizational system and internal communications according to claim 1, wherein a number of the plurality of rectangular crenellations and a number of the plurality of rectangular recesses are the same on one of the plurality rectangular panels having the opposite edges.

6. The organizational and internal communications system according to claim 1, wherein a number of the plurality of crenellations is one more than a number of the plurality of recesses on one of the plurality of rectangular panels having the opposite edges.

7. The organizational and internal communications system according to claim 1, wherein the width of the plurality of rectangular crenellations is the same as the width of the plurality of rectangular recesses on one of the plurality of rectangular panels include opposite edges.

8. The organizational and internal communications system according to claim 1, wherein the interlocking pin central spine has a shape selected from one of the following: solid, hollow, projected and holed.

9. The organizational and internal communications system according to claim 1, wherein the multiple rectangular modules comprises multiple square modules.

10. The organizational and internal communications system according to claim 9, wherein the multiple square modules include two-, three- or four-square wide.

11. The organizational and internal communications system according to claim 9, wherein the multiple square modules each includes a length and height that is a multiple integer of a single module.

12. The organizational and internal communications system according to claim 1, wherein the each of the multiple rectangular module comprises a rectangular functional accessory, said rectangular functional accessory comprising accessory tabs, wherein one of the accessory tabs is fitted into one of the accessory tab slots on the panels.

13. The organizational and internal communications system according to claim 12, wherein one of the accessory tabs is located at each corner of the rectangular functional accessory, and one of the accessory tab slots is configured and oriented for insertion by one of the accessory tabs disposed in the crenellations and recesses at two opposite edges of the panel; and
wherein such that the rectangular functional accessory and the panels being assembled together form a functional module, wherein an accessory tab channel on each accessory tab is aligned across the adjacent crenellations to form a complete channel.

14. The organizational and internal communications system according to claim 12, wherein the accessory tabs are located at the middle of each edge of the accessory, and the accessory tab slots are located in the middle of each panel.

15. The organizational and internal communications system according to claim 1, further comprising a rectangular box frame front cover to be secured to outermost interlocking pins of a rectangular assembly of multiple rectangular modules.

16. The organizational and internal communications system according to claim 1, wherein the modules have inconsecutive bars at their rear edges, the inconsecutive bars create gaps there between for routing of wires.

17. The organizational and internal communications system according to claim 1, wherein a center part of the plurality of the panels is selected from a group of materials consisting of wood, bamboo and plastic, while the crenellated edges of the panel comprise metal.

18. An organizational and internal communications apparatus, comprising:
multiple rectangular modules comprising a plurality of rectangular panels defined by four edges;
wherein each the multiple rectangular modules are formed by four rectangular panels, each of the four rectangular panels including alternating rectangular crenellations and rectangular recesses, inversely configured on opposite edges, wherein each of the rectangular crenellations includes an outwardly facing opening, wherein the opening is no more than one-third arc of a circle;
wherein each crenellation includes a width essentially identical to a width of the recess at the corresponding location on the opposite edges, wherein each of the crenellation includes a height equal to a thickness of the rectangular panels;
wherein crenellations of one of the four rectangular panels engage with recesses of two adjoining panels to form the module corners;
multiple interlocking pins substantially fit into space defined by longitudinal channels of four adjacent modules to keep them from moving apart, wherein each of the longitudinal channels includes a cross-section that is substantially circular;
wherein each of the multiple interlocking pins is longitudinal and has a central quadrilateral spine whose cross-section is four round-shaped corner beads; and
wherein the corner beads are integrally connected to corners of the central quadrilateral spine.

19. A method of assembly for the organizational and internal communications system comprising;
constructing a plurality of rectangular modules with a plurality of panels defined by four edges;
wherein each the multiple rectangular modules are formed by four rectangular panels, each of the four rectangular panels including alternating rectangular crenellations and rectangular recesses, inversely configured on opposite edges, wherein each of the rectangular crenellations includes an outwardly facing opening, wherein the opening is no more than one-third arc of a circle;
wherein each crenellation includes a width essentially identical to a width of the recess at the corresponding location on the opposite edges, wherein each of the crenellation includes a height equal to a thickness of the rectangular panels;
wherein crenellations of one of the four rectangular panels engage with recesses of two adjoining panels to form the module corners;
positioning multiple interlocking pins substantially fit into space defined by longitudinal channels of four adjacent modules to keep them from moving apart, wherein each of the longitudinal channels includes a cross-section that is substantially circular;
wherein each of the multiple interlocking pins is longitudinal and has a central quadrilateral spine whose cross-section is four round-shaped corner beads; and
wherein the corner beads are integrally connected to corners of the central quadrilateral spine.

* * * * *